(12) United States Patent
Thibadeau et al.

(10) Patent No.: US 8,813,183 B2
(45) Date of Patent: Aug. 19, 2014

(54) METHOD AND SYSTEM FOR PROCESSOR OR WEB LOGON

(75) Inventors: Robert H. Thibadeau, Pittsburgh, PA (US); Scott C. Marks, Chapel Hill, NC (US); Robert Thibadeau, Jr., Decatur, GA (US)

(73) Assignee: Antique Books, Inc., Pittsburgh, PA (US)

( * ) Notice: Subject to any disclaimer, the term of this patent is extended or adjusted under 35 U.S.C. 154(b) by 646 days.

(21) Appl. No.: 12/884,478

(22) Filed: Sep. 17, 2010

(65) Prior Publication Data

US 2011/0197259 A1 Aug. 11, 2011

Related U.S. Application Data

(60) Provisional application No. 61/303,384, filed on Feb. 11, 2010.

(51) Int. Cl.
| | | |
|---|---|---|
| *G06F 17/30* | (2006.01) | |
| *G06F 21/36* | (2013.01) | |
| *G06F 21/83* | (2013.01) | |
| *H04L 9/32* | (2006.01) | |
| *G06F 21/84* | (2013.01) | |

(52) U.S. Cl.
CPC ............... *G06F 21/36* (2013.01); *G06F 21/83* (2013.01); *H04L 9/3226* (2013.01); *G06F 21/84* (2013.01); *G06F 2221/2119* (2013.01); *G06F 2221/2141* (2013.01)
USPC ........ 726/2; 726/4; 726/17; 726/27; 713/168; 713/182

(58) Field of Classification Search
CPC ......... G06F 21/36; G06F 21/83; G06F 21/84; G06F 2221/2119; G06F 2221/2141; H04L 9/3226
See application file for complete search history.

(56) References Cited

U.S. PATENT DOCUMENTS

| | | | |
|---|---|---|---|
| 5,559,961 | A | 9/1996 | Blonder |
| 6,934,860 | B1 * | 8/2005 | Goldstein ..................... 713/183 |
| 7,243,239 | B2 | 7/2007 | Kirovski et al. |
| 7,734,930 | B2 | 6/2010 | Kirovski et al. |
| 8,024,775 | B2 | 9/2011 | Xu et al. |
| 8,191,126 | B2 | 5/2012 | Raghavan |
| 2004/0034801 | A1 * | 2/2004 | Jaeger ........................... 713/202 |
| 2004/0095384 | A1 * | 5/2004 | Avni et al. ..................... 345/745 |
| 2006/0206717 | A1 | 9/2006 | Holt et al. |

(Continued)

OTHER PUBLICATIONS

Hughes, N., "Future iPhones, iPads could recognize, adjust for individual users", AppleInsider, Aug. 19, 2010, 4 pp.

(Continued)

*Primary Examiner* — Shewaye Gelagay
(74) *Attorney, Agent, or Firm* — Withrow & Terranova, PLLC (57) ABSTRACT

A system is for a proof of knowledge enrollment or authentication. The system includes a processor having an input, an output and a routine; and a display having an image from the output of the processor. The routine is structured to input from the input of the processor a plurality of different position selections and/or a plurality of different path selections on the image. The routine is further structured to authenticate the proof of knowledge as a function of the plurality of different position selections and/or the plurality of different path selections on the image.

18 Claims, 11 Drawing Sheets

(56) References Cited

U.S. PATENT DOCUMENTS

| | | | |
|---|---|---|---|
| 2007/0150842 A1 | 6/2007 | Chaudhri et al. | |
| 2008/0163055 A1* | 7/2008 | Ganz et al. | 715/706 |
| 2008/0263361 A1* | 10/2008 | Dutta et al. | 713/182 |
| 2009/0313693 A1* | 12/2009 | Rogers | 726/21 |
| 2010/0043062 A1* | 2/2010 | Alexander et al. | 726/6 |
| 2010/0207721 A1 | 8/2010 | Nakajima et al. | |

OTHER PUBLICATIONS

Jansen, W., et al., "Picture Password: A Visual Login Technique for Mobile Devices", National Institute of Standards and Technology, NISTIR 7030, Jul. 2003, 20 pp.

United States Patent and Trademark Office, "International Preliminary Report on Patentability", May 23, 2012, 21 pp.

* cited by examiner

METHOD AND SYSTEM FOR PROCESSOR OR WEB LOGON

CROSS REFERENCE TO RELATED APPLICATION

This application claims the benefit of U.S. Provisional Patent Application Ser. No. 61/303,384, filed Feb. 11, 2010, which is incorporated by reference herein.

BACKGROUND

Background Information

Computer systems that employ authorization typically use a username and password, an identification card and PIN, or another suitable variant that involves "something you know" that must be typed into a typing window.

Authentication methods and systems involve an enrollment phase that defines authentication credentials, and a use phase where the replication of the authentication credentials constitute a proof of knowledge.

It is important that it be possible to measure the entropy or uncertainty and therefore the information value of the proof of knowledge. Entropy is a function of an event occurring. For example, if an event is generated as an ordered string of 128 binary symbols or bits, and the bits are perfectly random, then the bits have no contingent probabilities among them. In this string, the entropy can be said to be $2^{128}$, or 128 bits of information ($\log_2(2^{128})$) in any given selection, since the probability of the entire string occurring is $1/(2^{128})$. It is generally accepted today that an event with 80 or more bits of entropy is infeasible to guess even using relatively powerful computers. The entropy provides a direct measure of the strength of the proof of knowledge against an attacker trying to replicate the proof of knowledge without any hints other than those which he/she can guess without any knowledge of the proof of knowledge itself. Therefore, any authentication method should both show how enrollment takes place and how the entropy can be computed. The method should further be scalable to a desired entropy level.

As an example of this reasoning with a typical textual login, the enrollment requires typing in a passphrase, and the entropy is the likelihood of that passphrase being guessed. Passphrases that are simple English words, like "house", are relatively very poor because an attacker with the guess that the person used an English word requires him/her only to guess a few tens of thousands of passphrases. Whereas, a passphrase generated randomly of upper and lower case alphanumerics and diacritics such as 8!Th5AmRIJY requires on average over $6*e^{23}$ guesses, or over 20,000,000 years of guessing and checking the proof, at a billion guesses a second. This example is far beyond the practical ability to guess so the passphrase provides high assurance.

There are many problems with such good textual passphrases, not the least of which is the difficulty in remembering good ones. People commonly use 4 digit PINs for passphrases even though this has the exceptionally low entropy of one in ten thousand or just over 13 bits. If strong textual passphrases are used, they often get written down and can be commonly found on slips of paper near the person's computer. Often security policies require changing passphrases every week and often require having a different passphrase for every computer account or web account (e.g., without limitation, a bank account; a brokerage account; an electronic billing or payment system). It rapidly becomes clear that such textual proofs of knowledge are impractical given the limits of human memory.

SUMMARY

These needs and others are met by embodiments of the disclosed concept, which input a plurality of different position selections and/or a plurality of different path selections on an image, and authenticate a proof of knowledge as a function of the different position selections and/or the different path selections on the image.

As one aspect of the disclosed concept, a method for a proof of knowledge enrollment or authentication comprises: accepting input to a processor of a set of a plurality of different position selections and/or a plurality of different path selections on an image; and authenticating said proof of knowledge by said processor as a function of said set.

As another aspect of the disclosed concept, a system is for a proof of knowledge enrollment or authentication. The system comprises: a processor including an input, an output and a routine; and a display including an image from the output of the processor, wherein the routine is structured to input from the input of the processor a plurality of different position selections and/or a plurality of different path selections on the image, and wherein the routine is further structured to authenticate the proof of knowledge as a function of the plurality of different position selections and/or the plurality of different path selections on the image.

As another aspect of the invention, a method for a proof of knowledge enrollment or authentication comprises: accepting input to a processor of a set of a plurality of different timing selections with respect to a predetermined sequence of sounds; and authenticating the proof of knowledge by the processor as a function of the set.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

The disclosed method and system optionally replace the need for a textual proof of knowledge with a set of a plurality of different position selections and/or a plurality of different path selections (e.g., without limitation, image-based clicks and strokes by mouse or touch), and therefore greatly reduce the effort, and hassle, in logging in while also providing more memorable passcode information and higher security assurance.

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a smart phone; a mobile phone; a tablet computer; a kiosk; a server offering web access; a microprocessor; a microcontroller; a microcomputer; a central processing unit; a mainframe computer; a mini-computer; a server; a networked processor; a controller; or any suitable processing device or apparatus.

As employed herein, the term "display" means an output of a processor structured to output an image. A display may optionally provide an input to a processor, such as for example and without limitation, a touchscreen.

As employed herein, the term "routine" means a program running on a processor.

As employed herein, the term "still picture" means a two dimensional array of digital pixel values.

As employed herein, the terms "click" and "touch" mean a point on an image.

As employed herein, the term "stroke" means two points on an image.

As employed herein, the term "drag path" means the path taken between the beginning point of a stroke and the end point of a stroke.

As employed herein, the term "sounds" means tones, the sensation perceived by the sense of hearing, mechanical radiant energy that is transmitted by longitudinal pressure waves in a material medium (as air) and is the objective cause of hearing, speech sounds, noise sounds, and/or prerecorded auditory material.

As employed herein, the term "predetermined sequence of sounds" means an order of sounds in succession and/or in combination, and in temporal relationships; music; and/or vocal, spoken, instrumental and/or mechanical sounds in temporal relationships having rhythm, melody and/or harmony.

As employed herein, the term "game" means a structured activity, usually undertaken for diversion, amusement and/or enjoyment and sometimes employed as an educational tool. Games are normally distinct from work, which is usually carried out for remuneration, and from art, which is more concerned with the expression of ideas. However, the distinction is not clear-cut, and many games are also considered to be work (e.g., without limitation, professional players of spectator games) or art (e.g., without limitation, jigsaw puzzles or games involving an artistic layout such as Mahjong solitaire, or some video games). Key components of games may include goals, rules, challenge and interaction. Games may include mental and/or physical stimulation.

The disclosed method and system involve an image (e.g., without limitation, a still picture; a motion picture with or without sound; a photograph) and knowledge about the image that a person can readily remember. In various embodiments of the disclosed concept, the method can be tuned to the preferred memory capabilities of the user while also providing the user with feedback as to how easy it would be for an attacker to guess his/her proof of knowledge.

Figure 1:
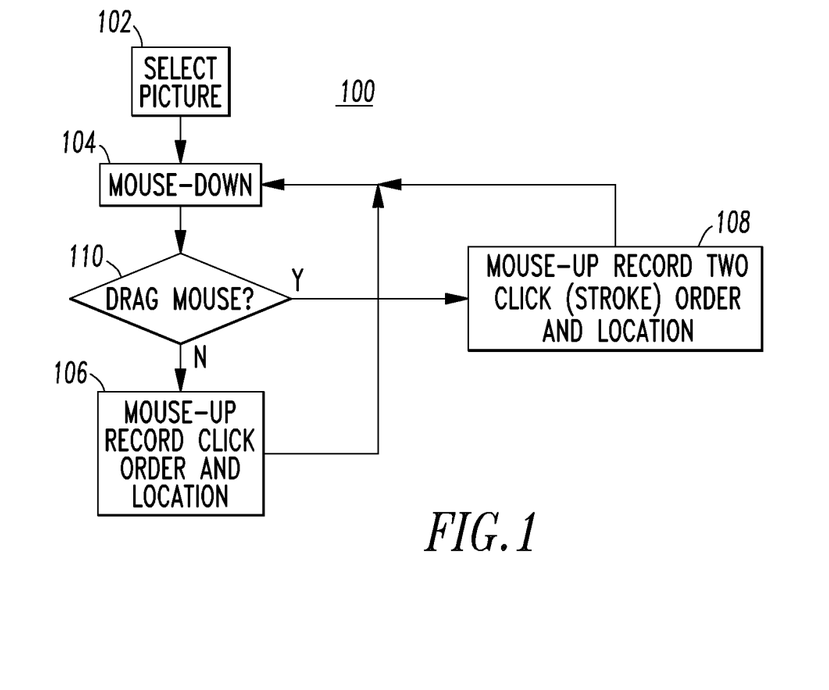
FIG. 1 is a flowchart of a general routine for collecting clicks and strokes over an image.

FIG. 1 shows an example general routine 100 for collecting example clicks and strokes over an image, such as a picture 102. The mouse-down 104 can also be a touch of a screen at a position, and the mouse-up 106 or 108 can be the removal of a touch. The drag path 110 can be a motion of the mouse, a trackball, a finger, a stylus, or another suitable screen positioning device.

Figure 2:
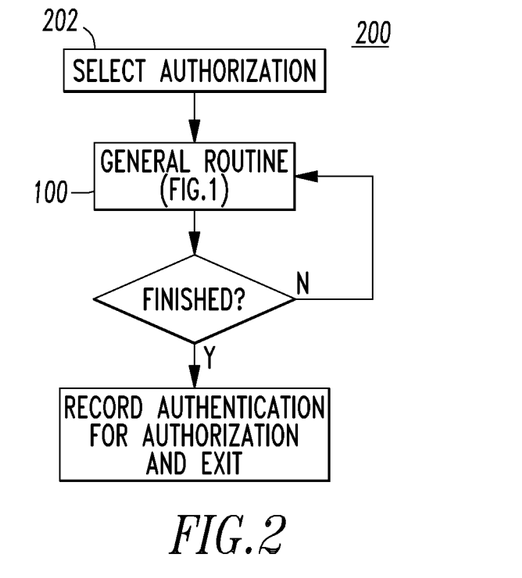
FIG. 2 is a flowchart of a routine for enrollment.
Figure 3:
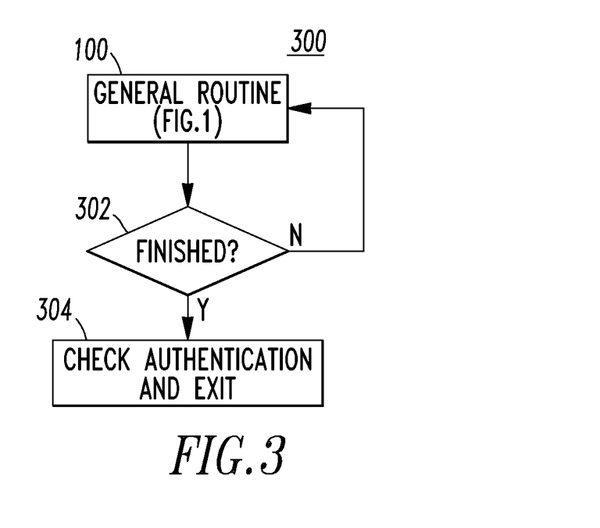
FIG. 3 is a flowchart of a routine for checking authentication after enrollment.

The two parts of an administrator/user routine are enrollment and use. FIGS. 2 and 3 show routines 200 and 300 for enrollment and use (checking authentication), respectively.

In the enrollment routine 200, there is a specific selection at 202 by the administrator of what authorization to assign to the proof of knowledge. A picture may also be the background of a desktop and a similar movement of draws/strokes and clicks over the background may authorize other entries even after initial logon. For example and without limitation, one proof of knowledge may authorize logon, another proof of knowledge may change the security role of the user, another may authenticate a user to a payment system, another may start a privileged program, another may allow a file to be viewed and edited, another may be required to find a treasure in a treasure hunt game, and another proof of knowledge may start a specially safe mode of computer operation such as, for example, a hypervisor-based secure virtual machine. In all cases, the enrollment of clicks, strokes and/or drag paths constitutes the knowledge that must later be proven by repeating the clicks, strokes, and/or drag paths.

In enrollment, the administrator may permit the user to self-select from a set of pictures offered, or have taken or otherwise obtained by the user. Indeed, this example method permits the user to have a set of pictures that he/she is comfortable using. The user looks at the picture and moves the mouse about it, clicking and/or dragging where he/she wants, in order to produce a two dimensional pattern of highly repeatable clicks, strokes, and/or drag paths that has a relatively high entropy over the domain of all clicks, strokes, and drag paths on the picture.

In the use routine 300, the picture is selected for the user, or the user may select it. The user then proves his/her knowledge by repeating his/her clicks and/or drag paths. Whether the order of clicks, strokes, stroke direction, and whether drag paths are important to this proof is determined at enrollment or by the embodiment of interest. The test of whether his/her proof of knowledge is finished at 302 may be implicit on contemporary authentication, or the user may explicitly indicate by a click on an appropriate icon or selection in a pop up window that he/she is finished with his/her proof of knowledge.

The proof of knowledge at 304 can concern the pattern of clicks, strokes, and/or drag paths relative to the picture. The entropy depends on the contingent probabilities of each click, stroke, and/or drag path. The image locations (measured by any suitable fixed mechanism but most typically in x and y relative to a defined image origin), that define the clicks, strokes, and/or drag paths may be partially ordered. The contingency depends in part on whether click order and stroke order, stroke direction, and/or drag path is part of the proof of knowledge. Without limitation, a proof of knowledge may have more than one successful sequence, yielding a proof of knowledge based on a particular decent of a tree or cyclic graph.

Figure 4:
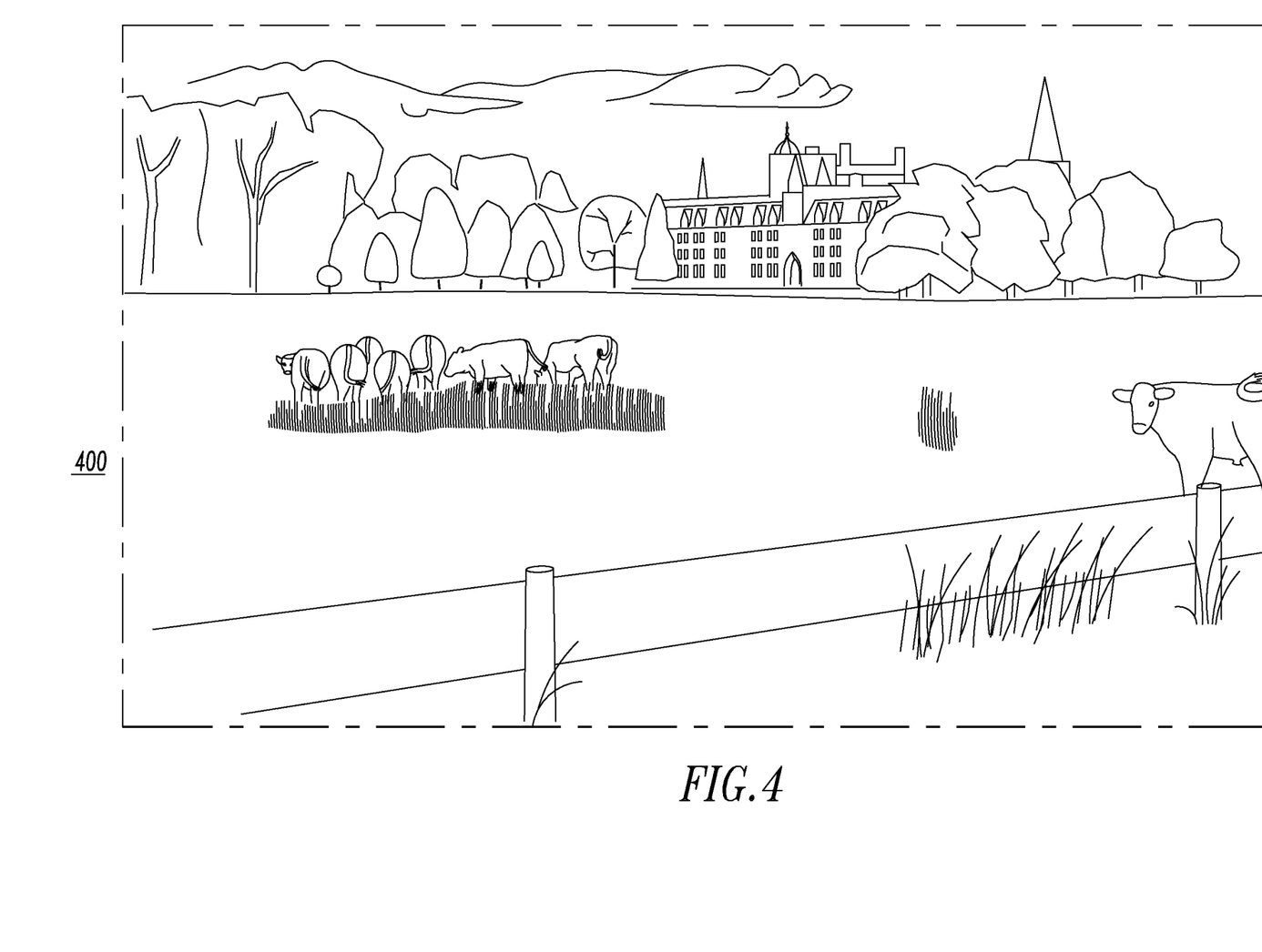
FIG. 4 is a representation of an image providing relatively high entropy.

FIG. 4 shows a representation of an image 400 particularly suitable for providing relatively high entropy using the present method. This is because the example picture has a lot of interesting visual detail.

Figure 5:
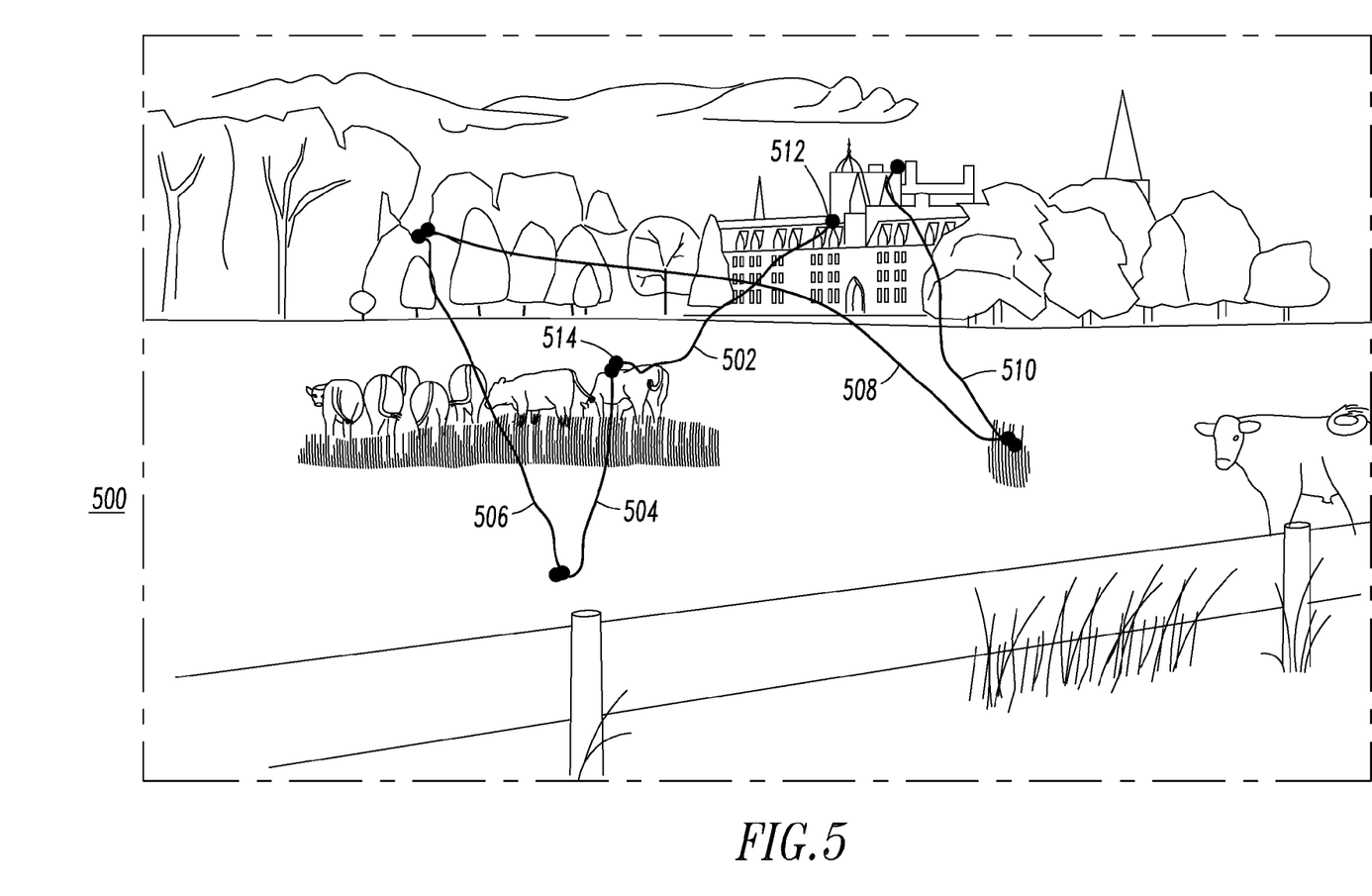
FIG. 5 is a representation of an enrollment of a series of strokes on the representation of the image of FIG. 4.

FIG. 5 shows a representation of an example enrollment 500 of a series of drag paths 502,504,506,508,510. The example drag paths are not straight lines because a person cannot easily move his/her mouse or fingers in a perfectly straight line. This also shows strokes between the mouse-down and mouse-up locations such as 512 and 514, respectively, for the drag path 502. The strokes are part of the example proof of knowledge. The proof of knowledge in this example is the ordered string of strokes. Additionally, a drag path may be an additional proof of knowledge when a choice is intentionally made to create a curving path.

Figure 6:
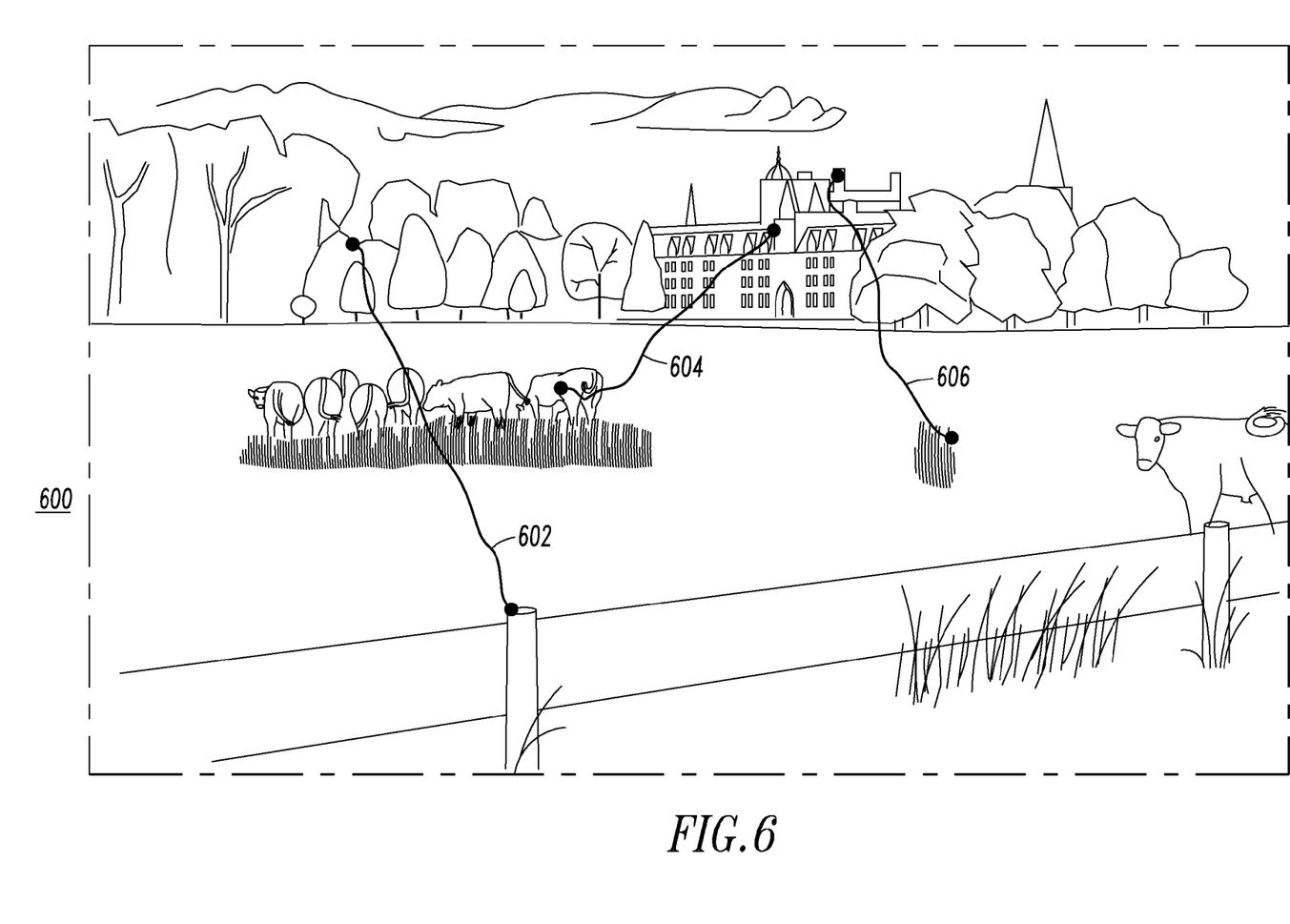
FIG. 6 is a representation of an enrollment of a series of unordered strokes on the representation of the image of FIG. 4.

FIG. 6 shows a representation of the same strokes 600 but now the proof of knowledge has three example strokes shown by the drag paths 602,604,606 in any order.

Figure 7:
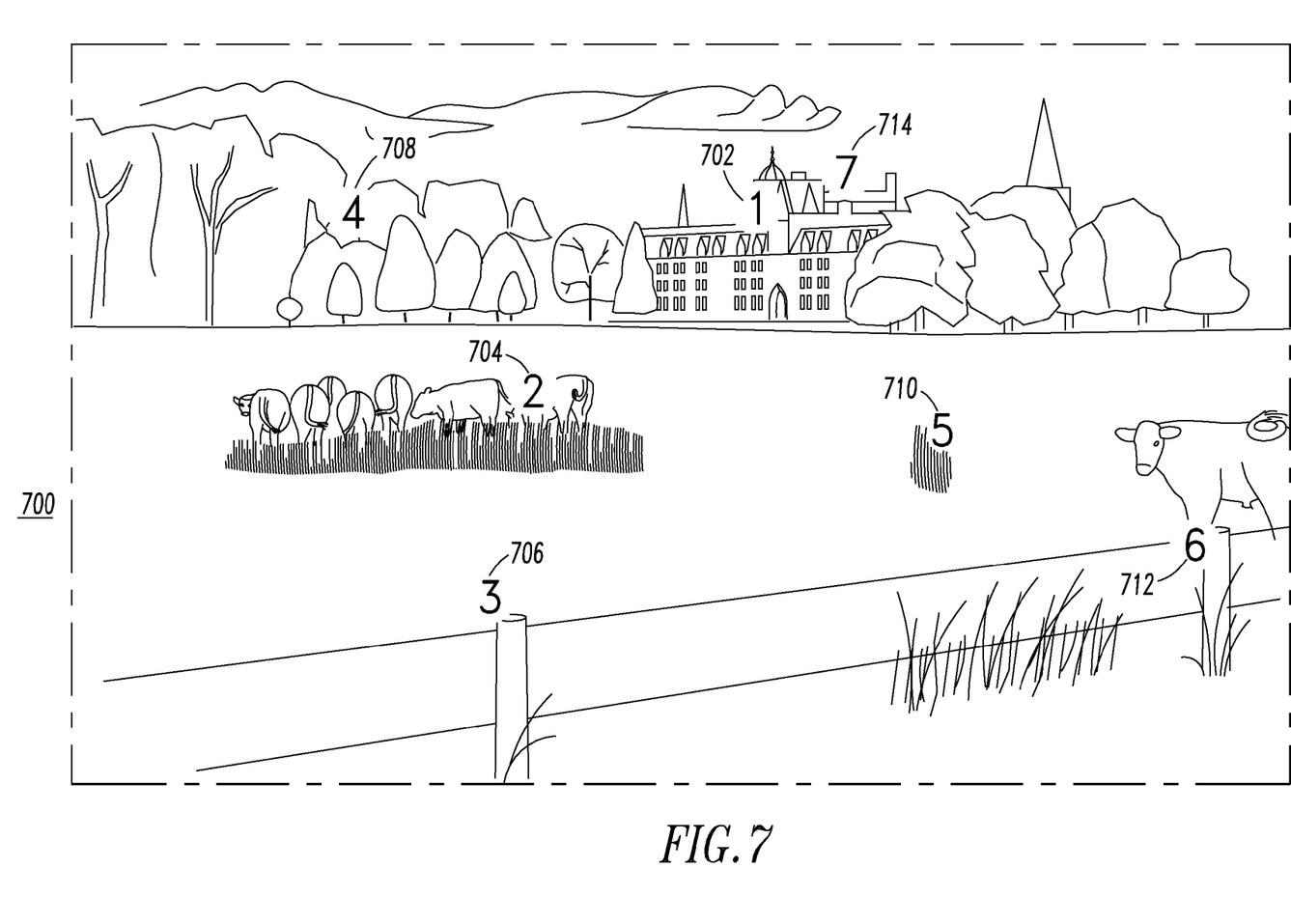
FIG. 7 is a representation of an enrollment of a series of ordered clicks on the representation of the image of FIG. 4.

FIG. 7 shows a representation 700 of the same example as clicks alone, but in a specific order of seven example clicks 702,704,706,708,710,712,714. Another example (not shown) is the same seven clicks but in any order. If stroke start-end direction, stroke sequence, and drag path are not part of the proof of knowledge, then a series of strokes can be regarded the same as an unordered set of clicks. A particular embodiment of the disclosed concept would select what is relevant to remember among the clicks, strokes, and/or drag paths. In one embodiment, the order of clicks and strokes is part of the proof of knowledge because it increases the entropy.

For any clicks with sequence, the binary entropy in bits is a $\log_2$ function of the clicks where each click is from a vocabulary of the number of clickable positions. For example, if the number is 256, then the entropy is associated with four successive equiprobable 8 bit choices which is $4*\log_2(256)$ or 32 bits of entropy. If the person could have enrolled with less than 4 clicks with equal probabilities, the entropy will be higher by $\log_2(256+256^2+256^3)$, or an additional 24 bits, giving 56 bits of entropy. If the person could have chosen a longer sequence of clicks, say, 8, the cumulative entropy is 110 bits. These are maximum entropy estimates based on the equiprobability assumption that every distinct ordered click sequence of every length possible is equally probable. Any deviation that assigns different probabilities for different lengths and sequences will reduce this value using well-known principles of information theory.

Consider two more examples: (1) a fine grid of 400 points, and (2) a coarse grid of 20 points. Use only three touches from the fine grid and six touches from the coarse grid, and do not consider that the person could have chosen more or less touches. For a sequence of clicks, the two cases come out the same:

$$400^3=20^6=64,000,000$$

$$\log_2(64,000,000)=25.93$$

For clicks and stroke end points without sequence, the entropy is lower for the same number of clicks. More generally, the equiprobability assumption is not met because the unordered selections would form a distribution of probabilities. In particular, for any given sequence of k clicks, there is at least k! indistinct permutations. The number of subsets of a given size are the same as the number of combinations $C(n,k)$, of n things taken k at a time: $C(n,k)=n!/((n-k)!(k!))$. The uncertainty is reduced, and with a smaller vocabulary or more clicks can be reduced significantly. The following combinatorics analysis is illustrative of the uncertainty reduction associated with a number of clicks or less and with equiprobable sets not equiprobable sequences. The reduction in this analysis is as before a likely underestimate of the reduction in entropy from the ordered equiprobable sequences. But this computation does illustrate that if click order is not important, then entropy is invariably reduced in association with a non-unary distribution of probabilities.

$$C(400,3)=10,586,800$$

$$\log_2(10,586,800)=23.33$$

$$C(20,6)=38,760$$

$$\log_2(38,760)=15.24$$

Partial ordering and other graph theory solutions further complicates the computation although the computation can continue to be done using information theory. So, partial or no order may be allowed in a particular embodiment, although it reduces the entropy over a full ordering. For this reason, one embodiment of the disclosed concept makes the order of clicks and strokes important to the proof of knowledge.

The ability to enroll strokes as well as clicks, on the other hand, increases the entropy. One way to think of simple strokes is that they square the set size over clicks alone. This doubles the entropy. If the proof of knowledge permits both clicks and strokes, then the entropy is further increased by the choice of whether a mouse-down-up (or touch) is a click or stroke.

Figure 8:
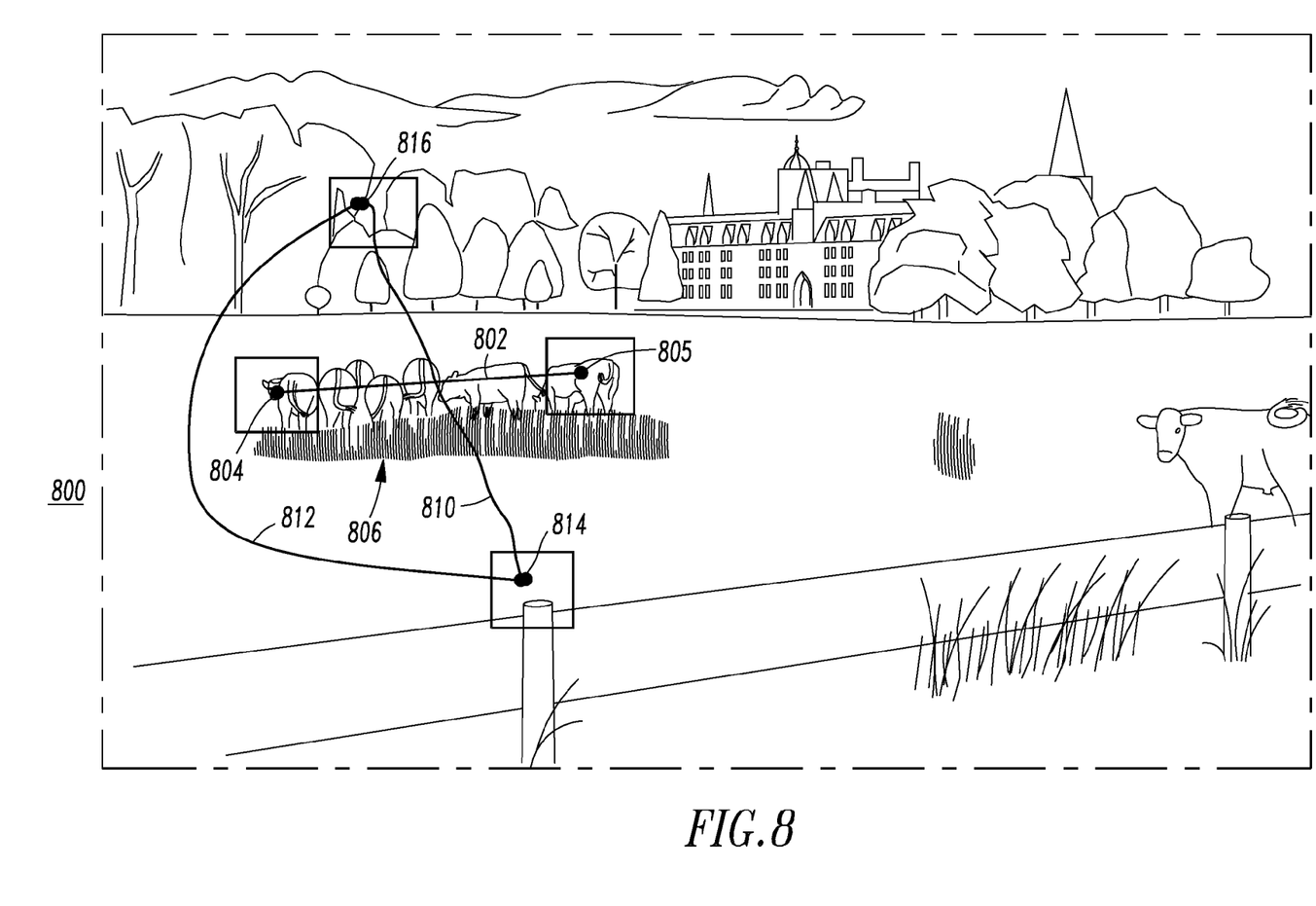
FIG. 8 is a representation of an enrollment including drag path information on the representation of the image of FIG. 4.

If there are optional drag path requirements, then entropy is added by the choice of whether a drag path crosses a straight line stroke between prior stroke endpoints or the drag path intentionally curves around it. FIG. 8 shows an embodiment of the disclosed concept when the proof of knowledge includes drag path information. This representation 800 shows that stroke 802 (e.g., the stroke from the beginning to the end of the cows 806) between mouse-down and mouse-up locations 804,805 crossed by the stroke for the drag path 810. Alternatively, the user could have entered the same stroke, followed the curving drag path 812 between 816 and 814 which intentionally did not cross the stroke 802 previously drawn between the cows 806. The user in enrollment draws these drag paths for any stroke that he/she desires to prove knowledge of drag path information. This illustrates that drag path using image cues can also improve entropy by the choice to avoid crossing a previous stroke. In the example there is one crossing with an avoidance possible (because a crossing cannot occur until the first stroke is made) which adds entropy.

The clicks and strokes may also repeat. A click, for example, may be performed twice at the same picture spot, or returned to after additional clicks and strokes. Repeating on the same picture spot however does not add to the entropy more than a click on a different spot but does not detract from it either.

The user chooses his/her clicks, stroke end points and drag paths based on the picture content. Certain areas of a picture may have a relatively higher likelihood of being chosen than other areas due to the visual detail in the picture. The equiprobable cases for the sources of entropy (the selection of a place on the picture, the order of the selections, the choice between click and stroke, and the choice to avoid a crossing in a drag path) constitute the maximum entropy. If the choices are not equiprobable, then the entropy decreases. In one embodiment of the disclosed concept, this non-random selection bias is treated in the entropy estimation using the well-known information theoretic methods to refine the entropy estimation for a particular proof of knowledge.

Now, compare the picture location entropy with conventional password entropy. Consider a strong specific security requirement of about 100 bits of entropy. The regular "strong password" alphabet is: abcdefghijklmnopqrstuvwxyzAB-CDEFGHIJKLMNOPQRSTUVWYXZ'~!@#$%^&*()_-+={[}]|\\:;"\'<,>.?/ or 84 choices, $\log_2(84)=6.39$. An equiprobable eight character sequence provides 51 bits entropy, but counting all sequences shorter provides a total of approximate 97 bits entropy.

By comparison, allowing clicks and strokes for 256 picture position choices to get the same security has $\log_2(256)=8$, and with doubling for the click or stroke choice, the entropy for 4 clicks or strokes is 64 bits, and for all sequences shorter a total of approximately 112 bits. So four clicks or strokes has approximately the same maximum entropy as an eight character passcode.

To provide the user an estimate of the entropy during enrollment, various other assumptions may be made that may increase or reduce the maximum entropy. For example and without limitation, the security policy may be to allow 4 to 8 clicks or strokes. If the user enters 6 clicks and strokes, the entropy may be computed as if he/she entered 8. However, if he/she enters 6 clicks, and no strokes, the security policy may say that this user is not using strokes, so the entropy for a click-only proof of knowledge may be computed as the estimate. Such assumptions have to be made by policy. As an extreme example, if the processor supports an unbounded number of clicks and strokes, but people rarely exceed 10, then a policy may say not to compute entropy over 10 clicks or strokes unless more than 10 clicks or strokes are actually input.

Embodiments Selected for Privacy

Relatively very high entropy can be generated in a set of clicks, strokes and drag paths. However, there is a trade-off between ease-of-use and security/privacy. This affects how entropy is calculated.

In one embodiment of the disclosed concept, the method constrains the user's input to a strict series of clicks and strokes. This ensures the highest security and privacy for the user, which can be further enhanced by drag path constraints. As will be seen, a less private system allows the user freedom over the order of clicks and strokes, including stroke direction.

Another optional privacy requirement, and how it impacts the various embodiments, can be explained by reference to standard textual passcode systems. In these systems, the choices are among a fixed set of keyboard choices that represent unambiguous, error-free, symbols, and the symbols must be entered in strict order. Because of these constraints, it is possible to prove knowledge of the passcode string without actually knowing the passcode string. In enrollment, the passcode string is cryptographically hashed. In use, the passcode string given by the user is also cryptographically hashed and the two hashes are compared. If the comparison matches perfectly, then the system can confirm the proof of knowledge without storing the actual passcode. In a relatively less private system, the system would match passcodes directly but the system would have a record of the actual passcode that the person uses.

Similarly, in one embodiment of the disclosed concept where the clicks and strokes and drag path crossings are required to follow or be recorded in a strict unambiguous order, it is possible to create an error free code that can be hashed in enrollment, and in use. In another embodiment, such as the simplest one of unordered clicks, the method of matching can be different and will likely sacrifice privacy.

The following example method simply looks at unordered clicks. There will inevitably be positional error between enrollment and use, in a click, stroke, or a drag path. For simplicity in presentation, this error can be expressed as a location distance expressed in image coordinates. If the image coordinates are in pixels in x and y, the location error distance can be provided in Euclidean, city-block, or another suitable distance. This error directly impacts the entropy of the authenticator since it says that any click (or drag path) within certain bounds is counted as the same and therefore strongly affects the probability. In a simple case, if the image is a total of 36 example pixels, in an example 6×6 square, then it can readily be seen that if the error allows any click in the tiling of the four 3×3 contained squares to represent only one of 4 unique symbols, then the entropy is not with the probability of 36 choices, but with 4. Any mechanism of accommodating the human positional error must recognize adjustment to entropy.

Figure 9:
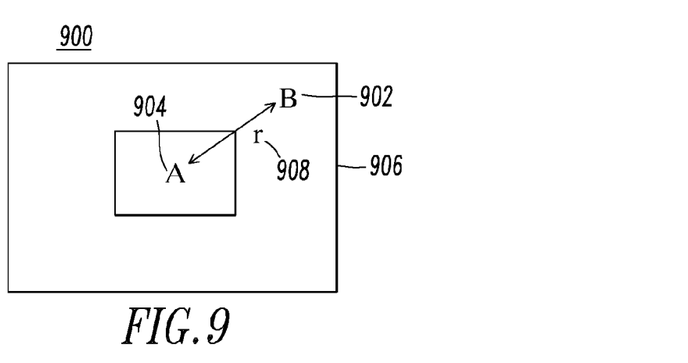
FIG. 9 is a simplified representation of an image showing how an unordered click can be evaluated as a proof of knowledge against a previously enrolled click in which an error region is tolerated as a proof of knowledge.
Figure 10:
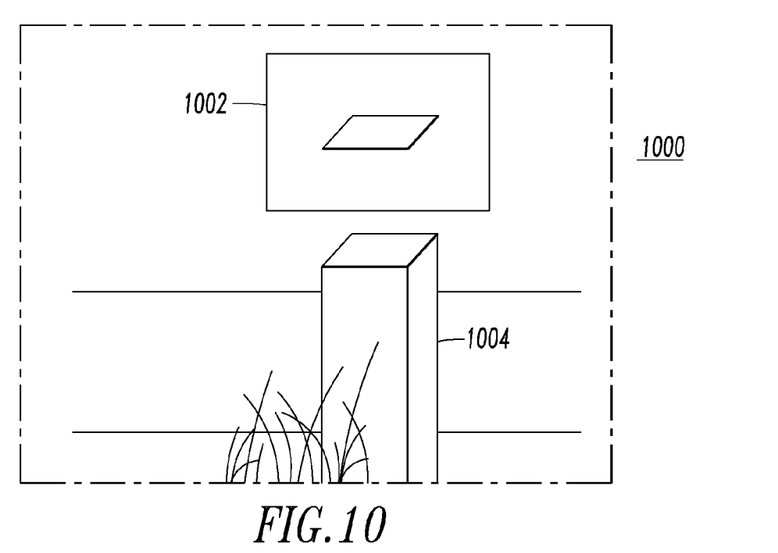
FIG. 10 is a representation of an image including a click point shown as a magnified inset image.

FIG. 9 shows a simulated representation 900 of how an unordered click B 902 can be evaluated as a proof of knowledge against a previously enrolled click A 904. There is a kernel region associated with click B 902, which is a region of the image defined as an enrolled click site A 904. Also shown is the error region 906 tolerated as a proof of knowledge. This is illustrated by example in the representation 1000 of an image in FIG. 10 as the position of the inset image of the click site 1002 shown for the top of the example post 1004. In FIG. 10, the method or system could compute the correlation of the inset image over the area of image shown to confirm that it's position error is "r" 908 (FIG. 9). If this positional error is below a suitable threshold, then the click is scored as having matched a click point. A simpler mechanism would simply compare (x,y) locations directly and score a click B 902 by its proximity to an enrolled click A 904.

Although FIGS. 9 and 10 show example rectangular regions, other suitable types are possible (e.g., without limitation, circular; tiled; hexagonal; any suitable two-dimensional shape).

Even if the proof of knowledge does not require an ordered set of clicks (and strokes), enrollment can be enhanced by imposing a minimum distance between clicks (and strokes) so as to always guarantee that a click (or stroke) within the error-tolerance will be recognized correctly. The problem of privacy, though, still remains, since the enrollment click locations are known in use of the system.

Figure 11:
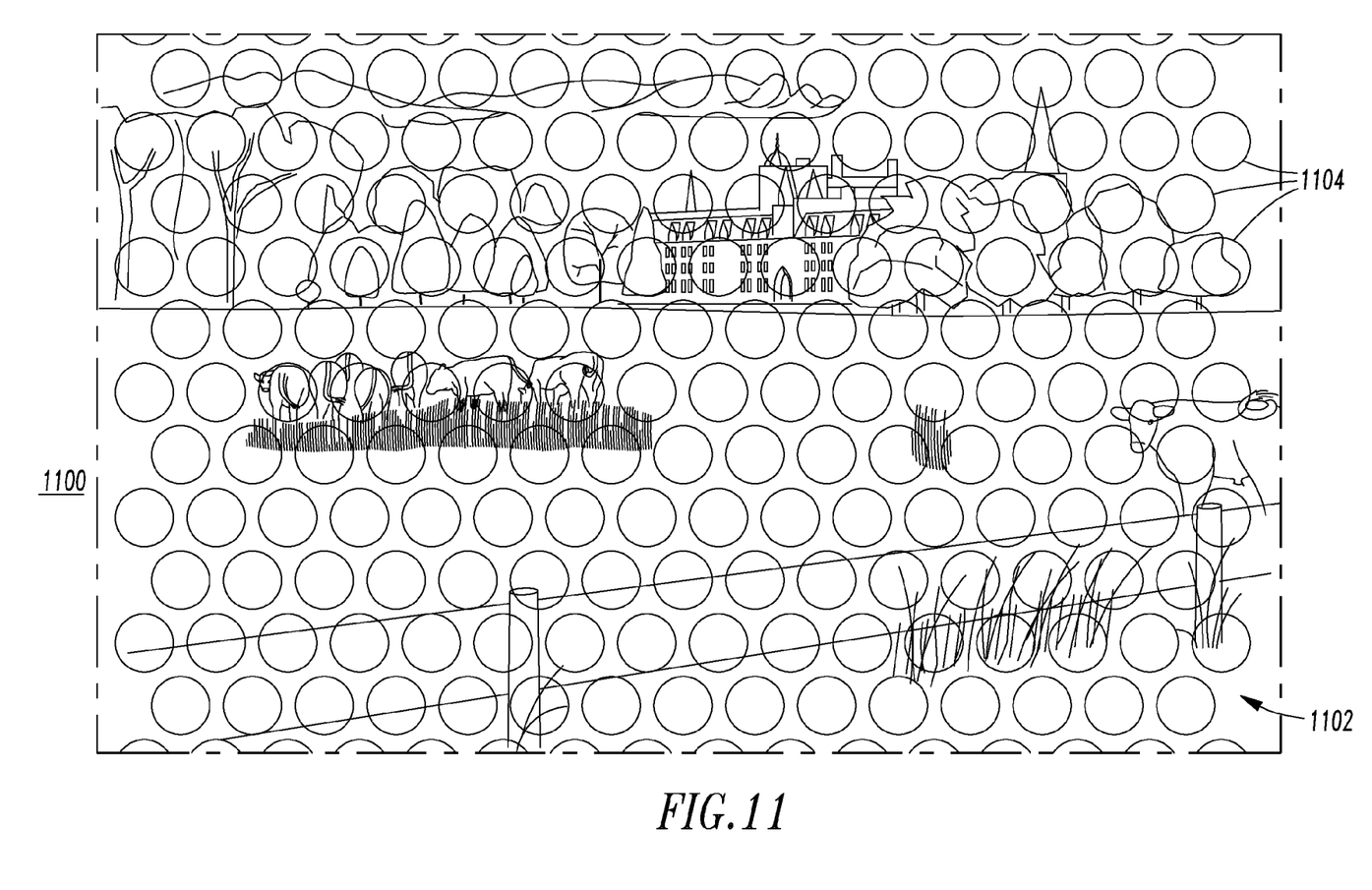
FIG. 11 is a representation of an image including a plurality of click points shown in an array.

FIG. 11 shows a representation 1100 of an image for a different method that permits relatively strong privacy similar to that obtained by character passcodes. In this method, the image is tiled with an implicit grid 1102. The selection regions may not be perfectly tiled, for example, if they are circles 1104, as shown. Packing the same sized circles 1104 in the example embodiment that makes the order of clicks and strokes important to the proof of knowledge packs them inside implicit hexagons. For enhanced usability, optionally, in enrollment the grid 1102 can be seen and the user notes that his/her clicks are automatically moved to the center of the grid element in which his/her click is entered. FIG. 11 shows a relatively moderate grid. It may be necessary to tolerate greater (less) error, in which case the user may have to select a relatively more coarse (fine) grid. Each grid location will constitute a symbol whose entropy is proportional to the number of grid locations and possibly the probability of a grid location being selected.

In another embodiment, the person may choose in enrollment to reposition the individual grid elements slightly but not so as to overlap, but he/she must be careful not to just position the grid elements he/she is using, because the repositioning itself may sacrifice privacy in use by the detection of the repositioning.

Figure 12:
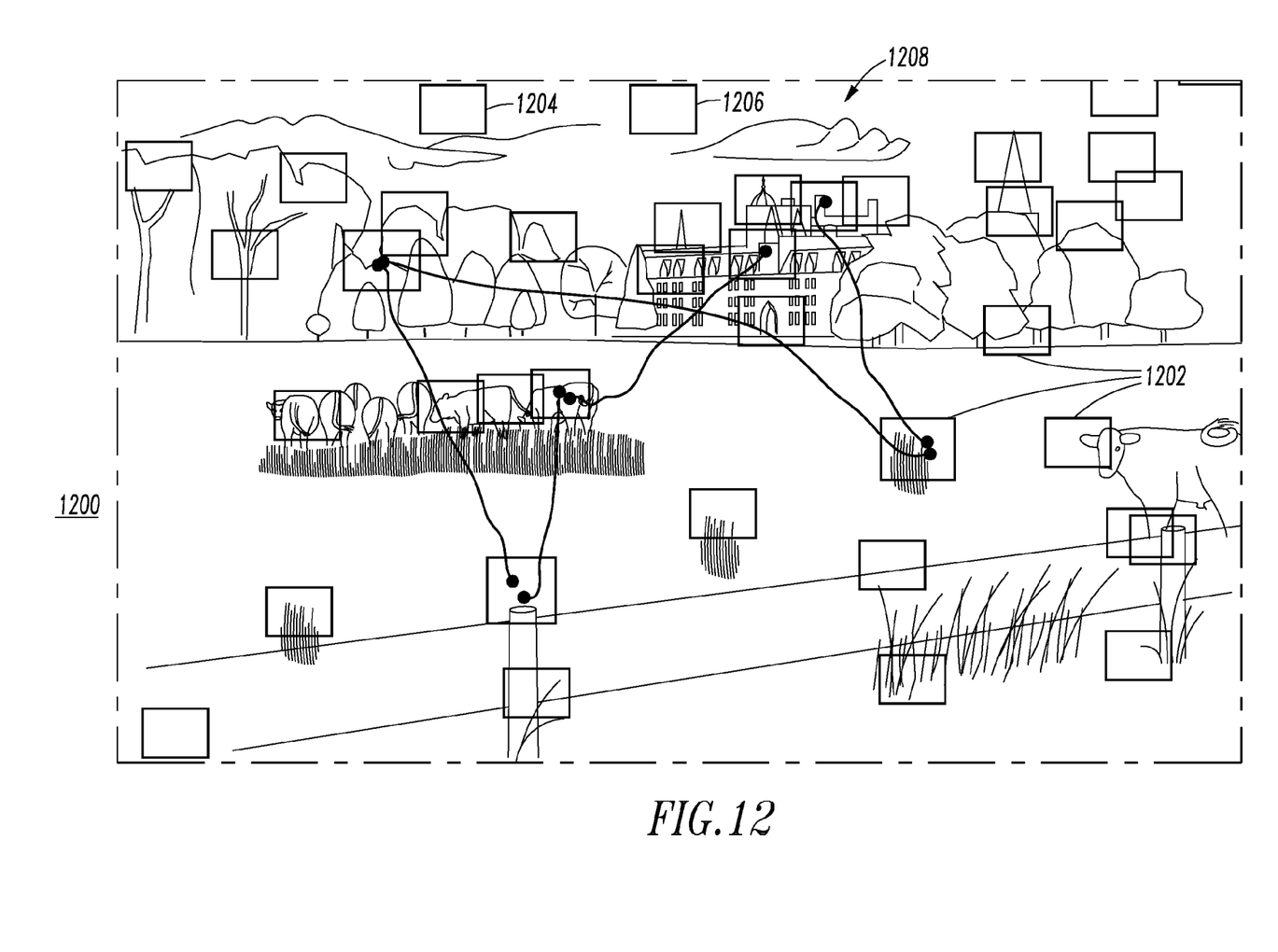
FIG. 12 is a representation of an image including a plurality of click points having different probabilities of being selected during enrollment.

FIG. 12 shows a representation 1200 of an image in which different grid points may have different probabilities of being selected in enrollment and therefore may affect the computed entropy. Most of the rectangles 1202 are points (with positional error) that are unique over the image, but the two example rectangles 1204,1206 are points (e.g., without limitation, portions of the sky 1208 of the example image) that contain no edge information and are therefore not as likely to be selected. Because the points are not equiprobable with other, more interesting and easily repeated points, both entropy and privacy are sacrificed. For this reason, images with many interesting areas are preferred for both entropy and privacy.

Other System Embodiments for the Method of Image Authentication

The click-stroke pattern is of sufficient entropy that it may optionally be used both to identify the user and the password simultaneously thereby averting even the need for the user to identify himself/herself in a separate operation such as typing his/her username or presenting an identity token. Without limitation, this may use two pictures: one for the processor to identify the user, and another the user picks to input his/her password. If it is needed to keep the username and password separate, then the sequence of example mouse clicks (or example finger taps) can serialize the state between username and password. If a relatively more complex authentication is desired, perhaps involving username, password, and role, then the same applies.

The clicks and strokes may also be reflected back to the user as lines and click symbols, or may be kept invisible so that another person or a camera or software cannot so easily detect the correct motions. Furthermore, a suitable comparator circuit, such as, for example, a relatively small flash memory, may protect the process of recognizing the authorization from other software or hardware inside the computer. This comparator circuit can also securely communicate with the mouse or other pointing device to put the pointing device into a scrambled mode while an authorization action is being taken.

Enrollment may require the distribution of new accounts by an administrator where the user is invited to change his/her password. For administrator enrollment, the administrator may create the user account and distribute a username and password as is conventional today, and then the user may select to use picture (or other image) logon when or after being offered or forced to change his/her password. In relatively more sophisticated systems, the administrator may give a picture and indicate the login is to, for example and without limitation, draw a moustache on an old man (e.g., in a picture of ten faces) or some other suitable login.

With picture enrollment, after picture selection, the user will be able to see feedback on his/her authorizing pattern of, for example, clicks and strokes. This may require the machine to be in a relatively more secure state, such as already logged in, in preboot, or in a suitably secure virtual machine. The feedback can show, for example, both the example lines being drawn and the example clicks, but also the example error tolerated by pattern recognition.

Figure 13A:
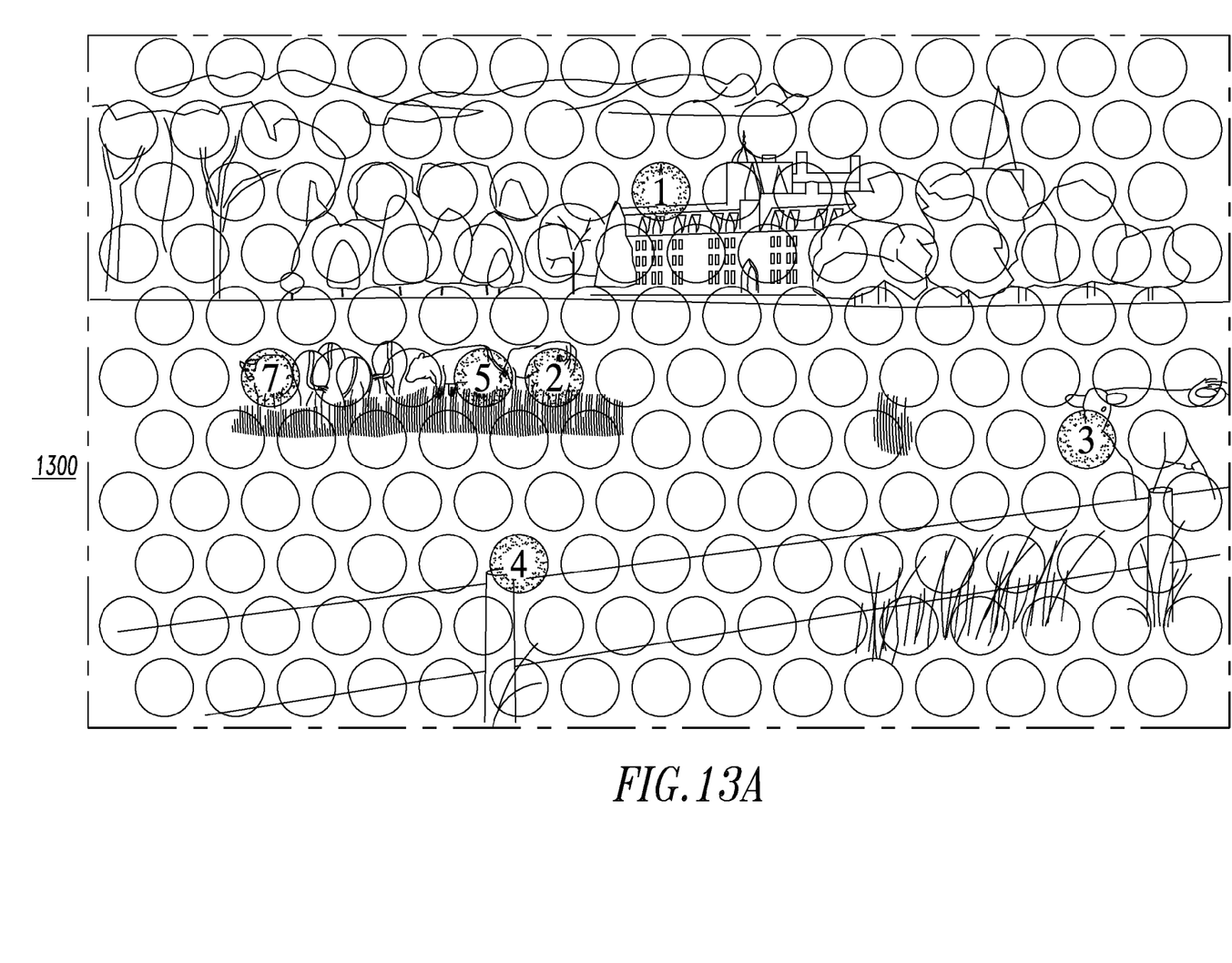
FIGS. 13A and 13B are representations of a practice session for the enrollment of a series of ordered clicks on an image in accordance with an embodiment of the disclosed concept.
Figure 13B:
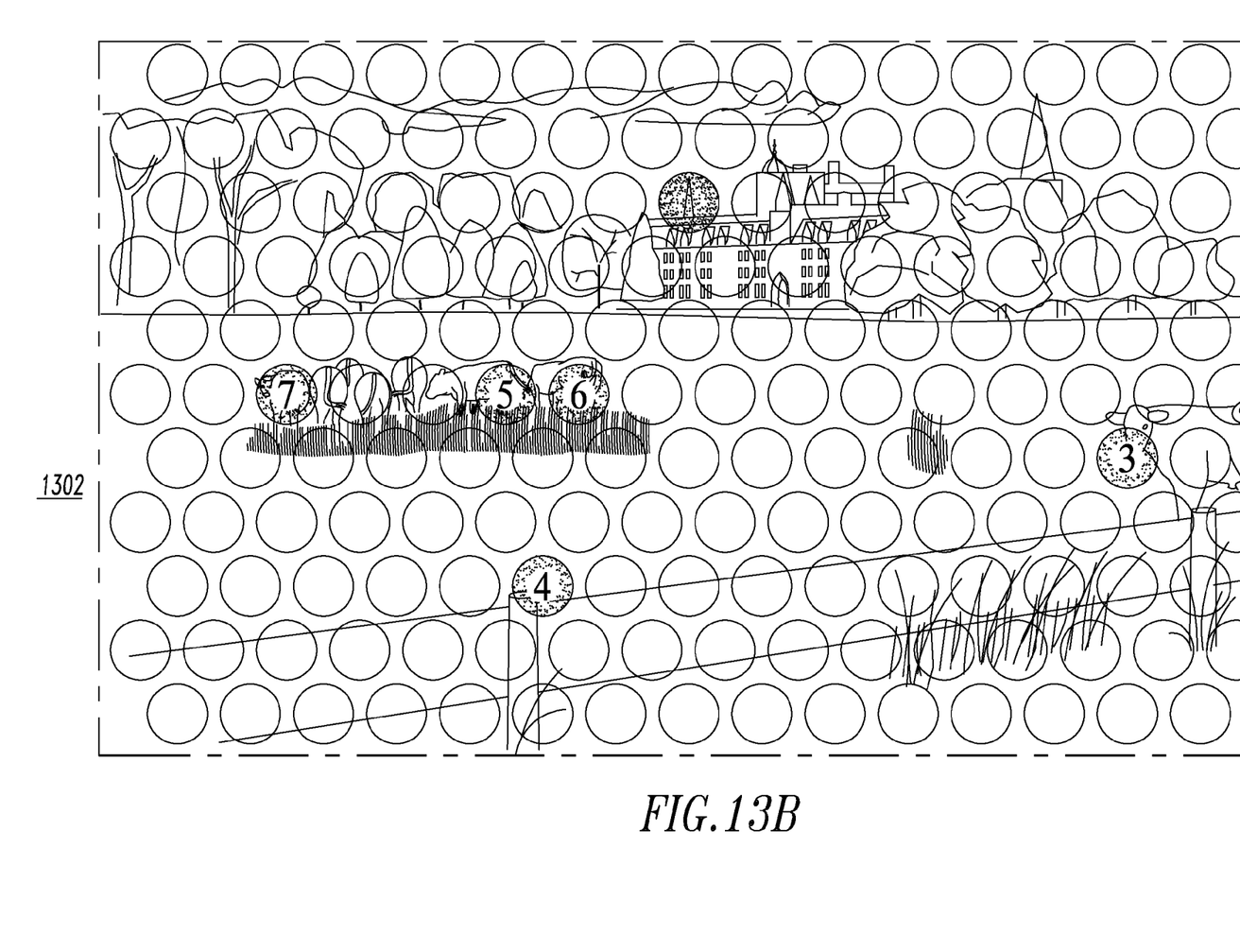

In enrollment, to help the user remember his/her clicks, strokes and drag paths, the embodiment that makes the order of clicks and strokes important to the proof of knowledge provides repeated practice with visual hints. For example, a grid of circles provides possible clicks and stroke end points, and these are numbered in the order in which the user input them as shown in representation 1300 in FIG. 13A. There, the grid of circles shows possible clicks and stroke end points numbered 1,2,3,4,5,7. In this example, the possible click and stroke end point numbered 6 is not shown since it is the same as the possible click and stroke end point numbered 2. If a click is repeated, then the number showing in the circle would be the lower number (e.g., number 2 of FIG. 13A), but when first clicked in practice (after the possible click and stroke end point numbered 1), it changes to the higher number (the possible click and stroke end point numbered 6) as shown in representation 1302 in FIG. 13B, which is after the user clicked on click and stroke end points numbered 1 and 2. There, the grid of circles shows possible clicks and stroke end points numbered 3,4,5,6,7. The same method for leading the user through practice applies to stroke end points. In this way, the user rapidly learns to remember his/her selection.

The system can optionally use the series of clicks and strokes and give the user an indication of the entropy of his/her login at least as a strength meter, the number of choices possible, or the estimated number of expected bits of entropy.

The procedure for enrollment and use can be employed to perform multiple identifications where each pattern of clicks and strokes is a series. For example, there may be a standard picture which selects user and role, which is then followed by the user's personal picture. A click (possibly this is just a mouse-down) starts a pattern. Then a search rule applies. With each successive sample, a search is done over the set of learned patterns. The learned patterns, as above, may be, for example and without limitation, for users and roles for a user, depending on enrollment. Furthermore, this successive search can be continued for the passcode at the sacrifice of privacy as described above. As each element of the successful match is met, a correction expectation may optionally be set for the next stroke element or click. This is to avoid successive timing or placement errors from building and to enable search. So, for example, a first click with an error diameter of 10, may select all authenticators that have a first click within the diameter of 10 around the click, but all such authenticators become candidates. A stroke (e.g. without limitation, mouse-down movement) may then select among the second in series and trigger based on coming within the error diameter associated with the next position of the proof of knowledge. This can be efficiently implemented as a string search tree for all learned authenticators and normal algorithms can be used managing different search trees. In a simple algorithm, the authenticators are kept in their raw form as well as implicitly in the search tree, and then if it is needed to delete an authenticator from a tree or add one to another tree, the raw forms are replayed.

If the pointing device is a multi-touch touch screen, then the above techniques can be applied to partial orders provided by multi-touch inputs. Relatively more sophisticated expression encoding will still have expressions that will have two-dimensional (2D) locations and order. An expression (e.g., without limitation, moving fingers together and apart) that can appear anywhere on the screen is simply a single grid position for the entire screen on that position. So, for example, if a multi-touch expression is detected, then it may be encoded as special and not 2D dependent.

Changes in Screen Size and Resolution

It is expected that the reference image is stretched in both X and Y to cover the visible/relevantly-pointable image surface. A non-relevant pointable surface may be a toolbar on the bottom or right as long as the image does not extend behind it. In this case, the person need only follow the image content to draw his/her authorizing signature.

Treasure Hunt Game Mode

As a non-limiting example, the disclosed concept may be extended as a game, such as, for example and without limitation, a treasure hunt game where success in entering a code sequence gains access to data or a secret and wins the game or a stage of the game. In one embodiment, a hint can be provided as a puzzle to guide each click or stroke in sequence. Successful completion results in an audiovisual reward or perhaps a secret message or link. The selection of a user, in this mode of operation, is the same as the selection of a game to play, with a game being comprised of at least a name, an image, a proof of knowledge, and hints. The game may have a hard mode and an easy mode corresponding to the privacy modes. In easy mode, each successful or unsuccessful click or stroke is made clear to the player. In the hard mode which corresponds to high privacy use, the entire sequence must be completed successfully, or a length exceeded, before success, or failure, can be determined. In the enrollment phase, where new users can be added, images selected, and codes established and practiced, new games can be created with new names, images, code sequences, and, additionally, hint sequences. With success, there may be a message or link also added in the treasure hunt game version of enrollment.

Types of Pictures

It may be seen that a motion picture, such as a series of pictures, or a movie, may be employed instead of a still picture, such as a single static picture. This embodiment adds a timing choice for a click or stroke that can further increase the effective entropy since a click, stroke end, or drag path would have a temporal dimension as well as a spatial dimension. This effectively increases the potential entropy many times because the number of choices goes up with the number of pictures in the movie. All of the above embodiments and considerations apply for a series of pictures in a movie as apply for a single picture, except that the timing of the click or stroke-end also becomes a choice. Additionally, a movie, or simply a single picture, may come with sound or music which can cue critical click-stroke timing as well.

Sound or Music Alone

Sound or music with no picture at all may also be marked by clicks (taps) and strokes (holding down) to achieve the same effects, now in time, as an alternative to using pictures at all. This reduces the entropy to whatever exists within the limits of permitted error. So, for example, if there are only clicks and the music permits 256 discrete points for taps, then the binary entropy is only $\log_2(256)$ or 8 bits. But with sufficiently long and interesting music, entropies comparable to what can be achieved with pictures or character strings are possible. As above, if the person can choose between a tap or holding-down, the entropy is doubled. Furthermore, if the person can tap any of several keys on the keyboard to the sound, then the set of choices similarly increases and the entropy can be computed based on information theory.

Picture Distortion

Once sufficiently practiced, a user may choose to distort the image of the picture on every viewing of it. Any attempt to surreptitiously record positions of the mouse or finger may then fail because positional replay will not be successful in proving knowledge that is specific to visual detail in the picture (or movie). Such distortion is also applicable to sound so that the actual tap and hold pattern changes according to the temporal distortion of the sound. For example, the image distortion can distort an image having an X-axis and a Y-axis normal to the X-axis. The image is spatially distorted in both the X-axis and in the normal Y-axis. Preferably, a first spatial distortion of the image in the X-axis is different than a second spatial distortion of the image in the normal Y-axis.

For example and without limitation, an image, I, is distorted by creating a distorted image, I', by the application of a discrete function of discrete variables for each dimension that determines where in the original image pixel data is sampled, Fx and Fy as in, $I'(x,y)=I(F_x(x),F_y(y))$. In the case of using a grid, the grid point centers are corrected with the same transformations. $F_x$ and $F_y$ should be monotonically increasing. If the original image boundaries are (0.00,0.00) and (1.00,1.00), then $F_x$ and $F_y$ may be any monotonically increasing functions such that there is sufficient distortion to change the grid points in order that knowing the (x,y) positions of the original image points does not guarantee knowing the (x,y) positions of the new points. Furthermore, at the extremes, (0.00, 0.00) and (1.00,1.00), $F_x(x)=x$ and $F_y(y)=y$. The functions $F_x(x)$ and $F_y(y)$ may, within these constraints, be randomly selected or may have random input variables, $r_x$ and $r_y$ as in $F_x(x,r_x)$ and $F_y(y,r_y)$. If the distortion is over a motion picture, such as a movie, then the distortion may add a discrete time parameter as in $F_t(t)$. If the distortion is over sound alone, then the distortion is solely over the discrete function $F_t$.

Example System

Figure 14:
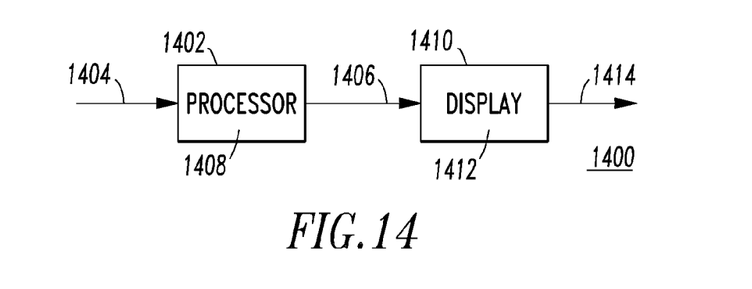
FIG. 14 is a block diagram of a system in accordance with an embodiment of the disclosed concept.

FIG. 14 shows an example system 1400 for a proof of knowledge enrollment or authentication. The system 1400 includes a processor 1402 having an input 1404, an output 1406 and a routine 1408, and a display 1410 having an image 1412 from the processor output 1406. The routine 1408 is structured to input from the processor input 1404 a plurality of different position selections and/or a plurality of different path selections on the image 1412, and is further structured to authenticate the proof of knowledge as a function of the plurality of different position selections and/or the plurality of different path selections on the image 1412.

Preferably, the routine 1408 is structured to distort the image 1412 prior inputting the different position selections and/or the different path selections on the image 1412.

Also, if the image 1412 is a motion picture with sound, then the display 1410 or processor output 1406 includes an audio output 1414, and the routine 1408 is further structured to distort the audio output (e.g., without limitations, change the timing of a number of sounds, which correspond to the intended timing of the various position selections and/or path selections).

Preferably, the routine 1408 is still further structured to enable a user to practice an ordered set of position selections and/or path selections.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method for a proof of knowledge enrollment or authentication, said method comprising:
   accepting input to a processor of a set of a plurality of different strokes and at least one drag path on an image;

authenticating said proof of knowledge by said processor as a function of said set and whether said at least one drag path crosses or does not cross one of said different strokes for a different drag path;
selecting as the image a motion picture with sound;
accepting input to the processor of a set of a plurality of different timing selections with respect to a predetermined sequence of sounds from the motion picture with sound; and
further authenticating said proof of knowledge by said processor as a function of said set of the different timing selections with respect to the predetermined sequence of sounds.

2. The method of claim 1 further comprising:
selecting said set from the group consisting of strokes, stroke directions, and drag paths on the image.

3. The method of claim 1 further comprising:
employing an at least partially ordered set of said strokes and said at least one drag path on the image.

4. The method of claim 1 further comprising:
employing an ordered set of said strokes and said at least one drag path on the image.

5. The method of claim 1 further comprising:
employing an unordered set of said strokes and said at least one drag path on the image.

6. The method of claim 1 further comprising:
distorting said sound; and
accepting input to the processor of the set of the plurality of different timing selections with respect to the predetermined sequence of sounds from the motion picture with the distorted sound.

7. The method of claim 1 further comprising:
employing stroke directions on the image as part of said set with said different strokes.

8. The method of claim 1 further comprising:
performing said accepting input and said authenticating as part of a game.

9. The method of claim 1 further comprising:
during enrollment, cryptographically deriving a first hashed passcode string as a function of said set and whether said at least one drag path crosses or does not cross one of said different strokes for the different drag path; and
employing as said authenticating said proof of knowledge by said processor:
during authentication, cryptographically deriving a second hashed passcode string as the function of said set and whether said at least one drag path crosses or does not cross one of said different strokes for the different drag path,
comparing the first hashed passcode string with the second hashed passcode string, and
confirming said proof of knowledge if the first hashed passcode string matches the second hashed passcode string.

10. The method of claim 1 further comprising:
employing as the image a single image; and
employing as said authenticating said proof of knowledge identifying a username and a password simultaneously from said set and whether said at least one drag path crosses or does not cross one of said different strokes for the different drag path.

11. The method of claim 1 further comprising:
employing as the image a first image;
employing, in part, as said authenticating said proof of knowledge identifying a username from said set and whether said at least one drag path crosses or does not cross one of said different strokes for the different drag path;
employing a second image;
accepting input to the processor of another set of a plurality of different strokes and another at least one drag path on the second image; and
further employing as said authenticating said proof of knowledge identifying a password from said another set and whether said another at least one drag path crosses or does not cross one of said different strokes of said another set.

12. A system for a proof of knowledge enrollment or authentication, said system comprising:
a processor including an input, an output and a routine; and
a display including an image from the output of said processor,
wherein the routine is structured to input from the input of said processor a plurality of different strokes and at least one drag path on the image,
wherein the routine is further structured to authenticate said proof of knowledge as a function of said plurality of different strokes, said at least one drag path and whether said at least one drag path crosses or does not cross one of said different strokes for a different drag path,
wherein the image is a motion picture with sound, and
wherein the routine is further structured to accept input to said processor of a set of a plurality of different timing selections with respect to a predetermined sequence of sounds from the motion picture with sound, and to further authenticate said proof of knowledge by said processor as a function of said set of the different timing selections with respect to the predetermined sequence of sounds.

13. The system of claim 12 wherein said plurality of different strokes and said at least one drag path are selected from the group consisting of strokes, stroke directions, and drag paths on the image.

14. The system of claim 12 wherein said plurality of different strokes and said at least one drag path on the image are at least partially ordered.

15. The system of claim 12 wherein said plurality of different strokes and said at least one drag path on the image are an ordered set.

16. The system of claim 12 wherein said plurality of different strokes and said at least one drag path on the image are an unordered set.

17. The system of claim 12 wherein the routine is further structured to distort the sound; and wherein the routine is further structured to accept input to said processor of the set of the plurality of different timing selections with respect to the predetermined sequence of sounds from the motion picture with the distorted sound.

18. The system of claim 12 wherein said plurality of different strokes comprise stroke directions on the image.

* * * * *